United States Patent [19]

Ledoux et al.

[11] Patent Number: 5,391,524
[45] Date of Patent: Feb. 21, 1995

[54] PRODUCTION OF HEAVY METAL CARBIDES OF HIGH SPECIFIC SURFACE AREA

[75] Inventors: Marc-Jacques Ledoux; Jean-Louis Guille; Cuong Pham-Huu; Sophie Marin, all of Strasbourg, France

[73] Assignee: Pechiney Electrometallurgie, Courbevoie, France

[21] Appl. No.: 32,858

[22] Filed: Jan. 7, 1993

Related U.S. Application Data

[62] Division of Ser. No. 613,627, Nov. 27, 1990, Pat. No. 5,308,597.

[51] Int. Cl.$^6$ .............................................. C04B 35/52
[52] U.S. Cl. ..................................... 501/91; 423/345; 502/407; 428/698
[58] Field of Search ............... 423/439, 440, 345, 346, 423/344; 501/87, 88, 91; 428/698, 699; 502/407

[56] References Cited

U.S. PATENT DOCUMENTS

| | | | |
|---|---|---|---|
| 3,269,802 | 8/1966 | Wainer et al. | 423/439 X |
| 3,927,181 | 12/1975 | Niimi et al. | 423/439 X |
| 4,008,090 | 2/1977 | Miyake et al. | 423/439 |
| 4,216,034 | 8/1980 | Miyake et al. | 75/240 X |
| 4,529,575 | 7/1985 | Enomoto et al. | 423/346 X |
| 4,784,839 | 11/1988 | Bachelard et al. | 423/439 X |
| 4,980,201 | 12/1990 | Tokunage et al. | 427/249 |
| 5,196,389 | 3/1993 | DuBots | 502/178 |

Primary Examiner—Mark L. Bell
Assistant Examiner—A. Wright
Attorney, Agent, or Firm—Dennison, Meserole, Pollack & Scheiner

[57] ABSTRACT

A method of producing heavy metal carbides of high specific surface area characterised in that a compound in the gazeous state of said heavy metal is caused to react with reactive carbon having a specific surface area at least equal to 200 $m^2.g^{-1}$ at a temperature comprised between 900° and 1400° C., and thus obtained carbides.

13 Claims, 1 Drawing Sheet

PRODUCTION OF HEAVY METAL CARBIDES OF HIGH SPECIFIC SURFACE AREA

This is a divisional of Application Ser. No. 07/613,627, filed Nov. 27, 1990, now U.S. Pat. No. 5,308,597.

TECHNICAL FIELD OF THE INVENTION

The invention relates to the production of metal carbides with a high specific surface area and stable even at high temperature and the activation of the said surface particularly when they are used as a catalyst in chemical reactions.

STATE OF THE ART

High temperature catalysis is in particular used in the petrochemicals industry (for example reforming . . . ), catalytic exhaust converters or any other high temperature chemical reaction.

On the one hand, it is interesting to be able to conduct catalytic reactions at the highest possible temperatures and on the other to be able economically to regenerate the catalysts with or without their carrier for repeated uses. With such an application in mind, it is necessary for the catalyst and/or its carrier not to be damaged when they are subjected to high temperatures. From this point of view, aluminina with a large surface area is not satisfactory. That is why the Applicants have already perfected a process for obtaining a catalyst carrier consisting of silicon carbide with a high specific surface area, doped or otherwise, on which the catalyst element is deposited (EP 88-420352-2).

Continuing their research, they then sought to obtain carbides of metals such as, for example, Mo, W, Ro, V, Nb, Ta, Ti . . . of high specific surface area, possibly in excess of 200 sq.m/g. These carbides likewise offer considerable interest as a high temperature catalyst carrier but in contrast to a non-metallic element such as Si, they exhibit catalytic properties as such, or they may exacerbate or modify the properties of the catalytic active phases (for example of Pt) which are deposited thereon. It is quite obvious that carbide powders having such a surface area may likewise be used for other applications such as, for example, the production of sintered parts having unprecedented properties, by means of simplified processes.

A process is already known (Journal of Catalysis Vol. 106, pp. 125–133, 1987) for obtaining $Mo_2C$ carbide of a specific area which does not exceed 100 sq.m/g, on the basis of a solid $MoO_3$ oxide and a $CH_4:H_2$ gaseous mixture according to a temperature programmed reaction which must take into account the value of the $H_2/CH_4$ ratio, a reaction which therefore calls for special attention if one is to avoid the formation of polymeric carbon which is a catalyst contaminant and which might possibly have to be destroyed by a special process. Furthermore, this fairly complex method does not lend itself readily to industrial production of a non-contaminated product.

Furthermore, the document Journal of Catalysis Vol. 112, pp. 44–53, 1988, while pointing out the need to have $Mo_2C$ carbide which has a specific surface area of more than 200 sq.m/g, suggests a method of obtaining purely an alpha-$MoC_{1-x}$ carbide with a specific surface area greater than 200 sq.m/g. This method is also more complex than that previously mentioned since it passes through an intermediate stage of producing a nitride which is then converted to the carbide likewise by a temperature programmed reaction.

OBJECTS OF THE INVENTION

Faced with these difficulties, the Applicants have sought to perfect a simple process which could be used for large scale production of metal carbides of high specific surface area, that is to say always greater than 20 sq.m/g or better than 50 sq.m/g but generally far greater than 100 sq.m/g, such a carbide possibly being in the form of granules or shaped pieces.

Another object of the invention is to provide heavy metal carbides which can be used preferably either as a catalyst carrier or as a catalyst used as such or deposited on a carrier; other applications of these carbides are likewise possible in other fields, for example sintering.

Another object is to obtain mixed carbides of heavy metals of high specific surface area which may offer significant advantages if used in catalysis. Thus it is possible to obtain shaped pieces or grains having a core of a different chemical nature from that of the periphery of the said mouldings or grains. Thus, these carbides can act either as a catalyst carrier or as an active catalyst.

DESCRIPTION OF THE INVENTION

The invention is a method of producing heavy metal carbides with a high specific surface area, characterised in that a compound of the said heavy metal is, while in the gaseous state, caused to react with reactive carbon having a specific surface area at least equal to 200 sq.m/g at a temperature of between 900° and 1400° C.

It is particularly suitable for the production of large granules or shaped pieces, transformation of the carbon to carbide being carried out over a thickness which may be as much as 2 mm.

The metal objects according to the invention are preferably transition metals (groups 3b, 4b, 5b, 6b, 7b, 8 of the series or periods 4, 5, 6), rare earths (lanthanides) and the actinides.

Furthermore, the said metals are obviously those which have a compound which is volatile at least under the temperature and pressure conditions of the reaction. Among these compounds, preferably chosen are the oxides or the iodides, but other compounds may be used, for example chlorides, fluorides or certain organometallic sublimable complexes. Among the metals which have this characteristic, those which are worthy of special attention for the catalytic interest of their carbides are metals such as Mo, W, R, V, Nb, or even Ta, Ti, Cr, Ni.

The method consists in causing the metallic compound in gaseous form to react with the reactive carbon of large surface area.

It is important that the gaseous metallic compound directly attack the reactive carbon which has the large specific surface area so that it is possible to retain a memory of the said large surface area in the resultant carbide with the surface properties needed for catalytic applications.

For this, it is sometimes advantageous at the start and in the reaction container to separate on the one hand the metallic compound and on the other the reactive carbon so that during the thermal treatment the gaseous metallic compound enters into reaction with the reactive carbon. Thus, it is possible to introduce into the reactor a layer of solid metallic compound, possibly covering it with a carbon felt and then dispose one or more shaped pieces or a layer of reactive carbon grains directly on the layer of compound or on the felt and then carry out a heat treatment under conditions such that the solid compound becomes gaseous and then reacts with the carbon.

It is preferable for gasification of the volatile compound to take place as close as possible to the reactive carbon so that the reaction contact is rapid. But the gaseous current may be generated in a separate evaporation zone.

In certain cases, generally determined by the chemical nature of the metal, it is likewise possible at the outset to bring the metallic compound and the reactive carbon in contact by an approximate or coarse mixture.

The reaction is performed at a temperature comprised between 900° and 1400° C. But it is advantageous to work at the lowest possible temperature, watching however to see that the reaction velocity is sufficiently high and so it is preferable to work at between 1000° and 1250° C. Beyond this temperature for the majority of carbides and particularly for molybdenum and tungsten carbides, a notable deterioration in the specific surface area obtained can be noted.

The reaction takes place under reduced pressure, normally less than 13 hPa (10 mm Hg). It is important that the partial pressure of the gaseous metallic compound should be as high as possible, the residual pressure being due mainly to CO produced by the reaction.

The reactive carbon subjected to reaction must have a BET specific surface area of at least 200 sq.m/g and it may be used in the form of a powder or as preformed pieces, for example by agglomeration of powders or by extrusion of a resin followed by a carbonising process.

Any type of active carbon, especially graphite, charcoal, carbon black, may be used but it is preferable to use granulated or agglomerated active carbon obtained, for instance, from decomposed resins or vegetable fibres.

The said carbon may be doped by a metallic element such as Ce, T, U, Zr, Hf, lanthanide . . . , by impregnation by means of a solution, aqueous or other, of a soluble compound (such as acetyl acetonate, nitrate . . . ) decomposed by a heat treatment prior to the method of obtaining the heavy metal carbide according to the invention. The specific surface area of the carbon is then somewhat less reduced during the doping treatment but it does generally remain higher than 200 sq.m/g and the rate of conversion of heavy metal carbide according to the invention may according to the doping element be substantially increased, the doping being of the order of 4 to 10% by weight of metal.

This doping may also give rise to modifications in the electronic structure of the carbide according to the invention, investing it with new catalytic properties.

The quantity of reactive carbon may be in excess in relation to the stoichiometry of the reaction for forming the heavy metal carbide, a reaction of the type: carbon+metallic oxide→carbon monoxide+metallic carbide.

The molar excess is normally at least greater than three times the said stoichiometric quantity and is preferably five times greater, which is translated for example, in the case of obtaining $Mo_2C$ and WC, in C/M molar ratios (M representing the metal) of 3/1 and 5/1 respectively. If the excess is less than the low limit the appearance of a metallic phase may greatly reduce the specific surface area of the carbide obtained. Similarly, if the temperature used is in the lower part of the range described, then it is worth while increasing the carbon excess (and thus the C/M ratio) to avoid the appearance of the metallic phase.

The rate of conversion of the active carbon is preferably between 40 and 100% but is preferably around 75% to have an excellent purity level in the carbide (absence of metal) and a vastly improved mechanical strength.

The invention can be carried out in various ways. Generally, a graphite crucible is used, closed by a simply fitted carbon felt cover which can be installed in an enclosure (for example a tube) of silica lined on the inside with a carbon felt and closed by a carbon felt cover; the tube is enclosed with a heating means and the whole is enclosed in a cooled sealing-tight casing inside which it is possible to establish a vacuum.

It is then possible to introduce into the crucible a mixture of reactive carbon powder, previously doped or not, and the solid compound of the heavy metal; having established the vacuum, it is heated to the selected reaction temperature at which the said compound must be gaseous and it is left at that temperature for the time it takes for the carburisation reaction to take place, normally from 1 to 7 hours. It is likewise possible firstly to introduce a layer of solid compound and then, covering it, a layer of reactive carbon, or a shaped piece of agglomerated active carbon, and then to heat as previously, once the vacuum has been established. A carbon felt may possibly be interposed between the carbon and the compound.

It is also possible to gasify the volatile compound at a temperature other than the reaction temperature. For this, the solid compound to be volatilised may be installed at the bottom of the crucible and the carbon may rest on a carbon felt situated at a distance from the said compound by means of spacers, heating of the bottom part and of the top part being carried out at different temperatures, for example using different heating densities of heating windings, etc.

The method according to the invention thus makes it possible to obtain carbides with a large specific surface area which is in excess of not only 100 sq.m/g, as has already been stated, but easily 200 sq.m/g or even 300 sq.m/g. These products, which can be obtained in large quantities, are easily handled and perfectly homogeneous even if at the outset the reagents were separated or were heterogeneously blended. Thus they can be used directly as an active catalyst, doped or otherwise, capable of regeneration but equally useful as a catalyst carrier.

According to a first improvement, the invention likewise makes it possible to obtain mixed carbides of high specific surface area. The term mixed carbides is understood to mean shaped pieces, granules . . . comprising a core covered by one or a plurality of successive outer layers of different types; the core may be of reactive carbon, as has been seen previously, or may consist of some other material of high specific surface area. This material may be either a metallic carbide according to the invention or a silicon carbide according to European Patent Application EP 88-420352-2, or any other oxide carrier such as silica, alumina, and the outer layer or layers are of metallic carbide of high specific surface area according to the invention, other than that of the core and different from one layer to the other. For example, the core may act as a catalyst carrier, the catalyst then consisting of the metallic carbide according to the invention which is used for the outer layer; this improvement makes it possible to limit consumption of the expensive gaseous metallic compound while retaining the catalytic properties of the mixed carbide obtained, but also to modify its mechanical properties as and when we wish.

A first variation on this improvement resides in partially reacting the heavy metal compound in the gaseous state with reactive carbon having a specific surface area at least equal to 200 sq.m/g at a temperature of between 900° C. and 1400° C., limiting the rate of conversion of the carbon into metallic carbide in order incompletely to convert the said carbon. Generally, the rate of conversion is limited to a level below 40% and preferably between about 10 and 20%; thus, an intermediate carbide-carbon compound is obtained (referred to likewise as a mixed carbide) comprising an outer layer of heavy metal carbide of high specific surface area, according to the invention, which coats the reactive carbon core.

Such a configuration makes it possible to obtain a carbide-carbon compound having reinforced mechanical properties in the event of the metallic carbide in itself having mechanical characteristics inferior to those of the reactive carbon.

To limit the rate of conversion of the reactive carbon, it is possible alternatively or in combination either to reduce the quantity of gaseous compound used in the reaction or to limit the duration of the said reaction, the other working conditions and the characteristics of the products employed being the same as those described earlier in order to avoid the formation of metal as an impurity.

In order, for example, to reinforce further the solidity of these carbide-carbon compounds, a second alternative version of the said improvement shows that in a first stage it is possible to transform the carbon core to a different metalloid or metal carbide in order to obtain a new sort of mixed carbide by reaction with a compound of the said metal or metalloid in the gaseous state.

During the course of this new stage, it is advantageous to convert the core into beta-SiC according to the method of European Patent Application EP 88-420352-2, in which SiO vapours are generated which are then brought into contact with the reactive carbon for conversion to SiC, here the carbide-carbon compound previously obtained, at a temperature of between 1100° and 1400° C.

In this case, according to the invention, a mixed carbide is obtained in the form of particles or pieces, comprising an outer layer of heavy metal carbide of large surface area and a silicon carbide core, normally with a large surface area, the said mixed carbide especially having improved solidity.

In the event of the outer layer being of molybdenum carbide, there is likewise an advantageous presence of molybdenum silicide.

But it is also possible during the course of the said new stage to obtain a carbide of another heavy metal by the method according to the present invention which is described earlier. In this case, the mixed carbide obtained comprises two different carbides of heavy metal which constitute on the one hand the outer layer and on the other the core, in order to meet the needs of certain particular applications.

The metals and their compounds which are used for transforming the carbon core into carbide may be chosen from among the same categories as those used for obtaining the outer layer, that is to say on the one hand the transition metals (3b, 4b, 5b, 6b, 7b, 8 of the series 4-5-6 of the periodic classification of elements), the rare earths or the actinides and on the other the oxides and the iodides.

These carbide-carbon compounds or mixed carbides, particularly that with a SiC core of high specific surface area and of improved solidity are particularly suitable for use as catalyst carriers or even directly as a catalyst in high temperature chemical reactions, particularly in the petrochemicals field (reforming, cracking, oxidation, etc. . . . ), catalytic exhaust converters, etc.

On the other hand, in view of a second improvement, the Applicants have demonstrated that after the preparation of heavy metal carbides of high specific surface area (mixed or not), their handling in the air may result in a superficial alteration of the said carbide.

Such a phenomenon occurs mainly with the oxidisable carbides and gives rise to the presence of superficial oxides which in particular affect the catalytic activity of the carbide. It is therefore important to be able to eliminate these oxides; this operation has to be carried out in situ, that is to say after the carbide of large surface area has been placed in the position where it has to be used as a catalyst, so that after having eliminated the oxides, the said catalyst is no longer in contact with the air or an oxidising atmosphere.

To eliminate the oxide, it is known to carry out a reduction by hydrogen at 800° C.; but with such an operation on the one hand there is no complete reduction of the oxide and on the other metal is formed so that the specific activity of the carbide catalyst is not regenerated: the catalyst obtained has a different selectivity and a diminished efficiency.

It is likewise possible to use a hydrogen-hydrocarbon mixture (for example pentane) at 700° C.; this is the normal method of preparing carbides; in this case, it is true that one does indeed obtain a carbide but also a deposit of polymeric carbon which contaminates the catalyst. This carbon deposit can only be partly eliminated by a treatment with hydrogen at 600° C. and a latent contamination persists; this latter is, for example, fairly substantial with WC but a little less substantial with $Mo_2C$ which catalyses this elimination in the form of a hydrocarbon.

Faced with these problems, the Applicants have, according to the said second improvement, found a process which makes it possible to improve the catalytic activity of the surface area of the catalysts which consist of heavy metal carbides of high specific surface area altered by a film of oxide, the said carbides being either simple carbides or an assembly of mixed carbides previously described. This method is characterised in that the said carbides are impregnated by means of a sufficiently dilute solution of a salt of at least one metal of the group 8, such as Pt, Pd, Rh, Co . . . in order to have an impregnated carbide comprising a little of the said metal, the impregnated carbide being dried and treated at a high temperature under a current of hydrogen and gaseous hydrocarbon.

It is advantageous to supplement the method by a finishing treatment consisting in passing over the resultant catalyst a flow of $H_2$ at high temperature, generally comprised between 300° C. and 700° and preferably between 400° and 600° C. for 1 to 20 hours approx., possibly with one or more intermediate temperature steps. This treatment may likewise comprise the prior establishment of a vacuum for 1 to 3 hours at nearly 350° to 500° C.

This improvement resides particularly in dispensing with the oxide or oxycarbide layer which temporarily passivated the surface of the carbide when it is brought in contact with the air after synthesis, without any substantial formation of polymeric carbon.

In the case of Pt, it is particularly important that the quantity of Pt retained by the impregnated carbide counted in percentage by weight of Pt in relation to the total mass of carbide treated should be limited. It is sufficient generally to use contents of at most 0.05% approx. and preferably in excess of 0.001%. Contents of 0.25% currently used on alumina carriers or with a view to obtaining heavy metal carbides are not appropriate within the framework of the present invention, because the activity of the catalyst will be that of the Pt and not that of the carbide.

The salt solution of the said metal of group 8 may be achieved by means of any solvent which can be eliminated by heating, for example water, alcohol, other sufficiently volatile organic solvents . . . Similarly, it is sufficient to choose a metal compound soluble in one of these solvents which does not leave any solid residue other than the metal after high temperature treatment.

Drying is generally carried out in the air and then in an oven at a temperature which is generally comprised between 120° and 140° C.

The $H_2$ hydrocarbon mixture may have any proportions provided that the necessary quantity of constituent elements is available to carry out reduction and carburisation of the oxide film. Generally the hydrocarbon is used in proportions (by volume) of 1 to 50%. It is advantageous to use this mixture in excess and to recycle the excess after having eliminated the water produced in it during the course of reaction, for example by condensation.

The hydrocarbon is preferably aliphatic, for example pentane or a mixture of hydrocarbons.

Generally, the high temperature treatment is carried out at temperatures above 500° C. or preferably 700° C. It is usually easier to work at atmospheric pressure; the use of other pressures is possible.

The said second improvement thus makes it possible to obtain a catalyst based on heavy metal carbides having an isomerisation efficiency which is better than that of a conventional Pt catalyst consisting, for example, of 0.25% Pt on an alumina carrier used under the same temperature conditions. It is important to note that this selectivity is due and is peculiar to carbides prepared in this way and is entirely different from the selectivity of the Pt. Particularly with tungsten carbide it is possible under certain conditions to develop substantial aromatisation, which is a favourable bonus.

After use and exhaustion of the catalyst, its regeneration may advantageously be carried out by treatment in hydrogen at 600° C., an operation which is fairly remote from conventional oxidising regeneration but far simpler to carry out, particularly in an industrial environment.

The catalysts and catalyst carriers according to the invention may be used in all the high temperature chemical reactions and particularly in the petrochemicals field (cracking, reforming . . . ) or in catalytic exhaust converters for internal combustion engines.

The application of heavy metal carbides of high specific surface area according to the invention to the catalytic conversion of exhaust gases from internal combustion engines is particularly interesting. Especially with the gases from exhaust pots of motor vehicles, the said carbides are used and are effective at a temperature higher than 200° C. or more generally around 350° C. or more.

These carbides, used as a catalyst, make it possible according to this application completely to convert the exhaust gases: NOx into nitrogen, carbon monoxide into dioxide, hydrocarbons into $CO_2$ and water.

It is possible to use as heavy metal carbides the simple carbides and especially $Mo_2C$, WC . . . but also mixed carbides, especially those containing an SiC core or a core of reactive carbon covered with a heavy metal carbide of high specific surface area, for example of the type $Mo_2C$, WC . . . .

It is advantageous to carry out the conversion reaction in the presence of the metallic carbide catalyst, to perform an activation of the surface of the said carbide according to the second improvement described hereinabove. Let us remember that this activation substantially comprises impregnation of the metallic carbide with a small quantity of a salt in a solution of a group 8 metal of the periodic classification of elements (especially Pt), drying, heat treatment at high temperature in the presence of $H_2$ and gaseous hydrocarbide and possibly a finishing treatment at high temperature in the presence of H2; the thermal treatments are carried out generally after having installed the carbide at the place where the catalytic conversion reaction is to be carried out.

It may likewise be advantageous to modify the active surface area of the carbide according to the invention by partially nitriding and oxidising it, the carbide, doped with nitride and oxide thus obtained possibly having special catalytic properties.

Regeneration after use of carbides with a very large specific surface area according to the invention used as a carrier or as a catalyst may be carried out simply, for example, by thermal treatment with hydrogen as has already been stated.

These carbides of high specific surface area may likewise open up the way to fresh applications in fields such as the sintering of carbides, surface coatings using carbides, etc.

EXAMPLES

Example 1

Figure 1:
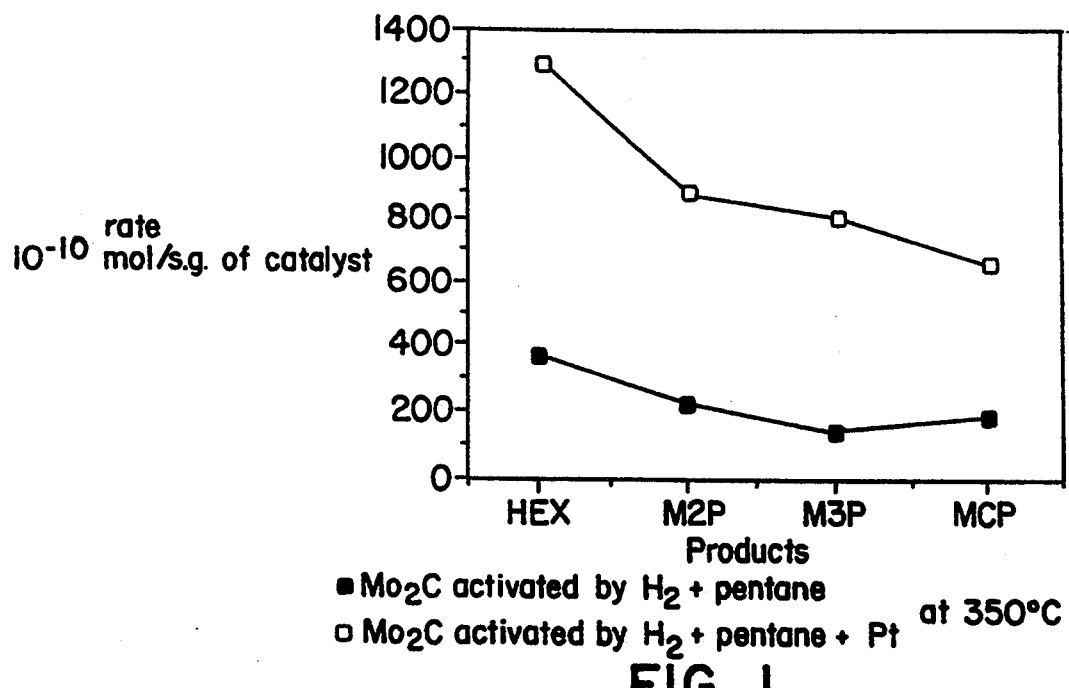
FIG. 1 is a graph of activity versus type of catalyst for a $MO_2C$ catalyst.

This example illustrates the obtaining of a molybdenum carbide with a high specific surface area according to the reaction: 2 $MoO_3$ (vapour) + C (solid) → $Mo_2C$ + 3 CO.

In a first series of tests, a summary mixture of active carbon was prepared in particles of 0.2 to 0.5 mm having a specific surface area of about 1150 sq.m/g and a solid oxide powder $MoO_3$. This mixture was introduced into a graphite reactor as seen earlier. The enclosure was placed under a vacuum of 0.13 hPa (0.1 mm Hg) prior to heating. The main working conditions and the results of specific surface area obtained by BET measurement are set out in Table 1.

TABLE 1

| Test | Amount of carbon involved g | Amount of Mo 03 involved g | Reaction temperature °C. | Duration hours | C/Mo molar | Specific surface area of carbide m$^2$/g | Carbon conversion (including CO) % | Mass recovered g |
| --- | --- | --- | --- | --- | --- | --- | --- | --- |
| 4 | 1.058 | 2.169 | 1155 | 3½ | 6/1 | 213 | 50% | 1.716 |
| 5 | 1.144 | 2.614 | 1140 | 3½ | 5/1 | 191 | 64% | 2.033 |
| 7 | 1.141 | 3.646 | 1160 | 3½ | 4/1 | 89 | 76% | 2.588 |
| 8 | 1.203 | 4.734 | 1155 | 3½ | 3/1 | 40 | 100% | 2.854 |
| 9 | 1.213 | 7.278 | 1155 | 3½ | 2/1 | 2 | 100% | 2.918 |

Test 9 illustrates that when the carbon excess is insufficient, the high specific surface area cannot be obtained.

The rate of conversion is calculated in relation to the amount of carbon at the start, taking into account the CO which is formed.

All the products have a very homogeneous appearance.

The main product obtained is hexagonal Mo$_2$C sometimes with traces of cubic Mo$_2$, gamma MoC and/or metal.

Thus, hexagonal carbide Mo$_2$C is obtained which has a specific surface area of more than 100 sq.m/g in tests 4 and 5 and 200 sq.m/g in test 4 and although the specific surface area is high in tests 7 and 8, one can see that it is markedly below that of tests 4 and 5. This is due to the presence of a fairly substantial metallic phase and illustrates how important it is to work with a considerable carbon excess.

A second series of tests was carried out by the same method to test the effect of the reaction temperature; the tests are shown in Table 2.

TABLE 2

| Test | Amount of carbon involved g | Amount of Mo 03 involved g | Reaction temperature °C. | Duration hours | C/Mo molar | Specific surface area of the carbide m$^2$/g | Carbon conversion (including CO) % | Mass recovered g |
| --- | --- | --- | --- | --- | --- | --- | --- | --- |
| 14 | 1.005 | 2.016 | 1210 | 4 | 6/1 | 139 | 50% | 1.442 |
| 15 | 1.208 | 2.781 | 1170 | 4 | 5.2/1 | 159 | 58% | 2.09 |
| 16 | 0.987 | 2.013 | 1150 | 4 | 6/1 | 202 | 51% | 1.596 |
| 17 | 1.227 | 2.157 | 1120 | 4 | 6.8/1 | 261 | 47% | 1.851 |
| 18 | 1.001 | 2.024 | 1065 | 4 | 6/1 | 239 | 51% | 1.465 |

In these tests, the product obtained is the same as before: hexagonal Mo$_2$C sometimes with traces of cubic Mo$_2$C, gamma MoC and/or Mo metal.

It can be seen that, everything else being equal, the greater specific surface areas are obtained with the lesser temperatures.

A third series of tests was carried out by initially separating the active carbon particles from the solid powdered subjacent Mo03 by a carbon felt in order to test the effect of the reaction time. The other reaction parameters were the same as before. The results are given in Table 3.

TABLE 3

| Test | Amount of carbon involved g | Amount of Mo 03 involved g | Reaction temperature °C. | Duration hours | C/Mo molar | Specific surface area of carbide m$^2$/g | Carbon conversion (CO included) % | Residual$^{Mo}$ (metal) % |
| --- | --- | --- | --- | --- | --- | --- | --- | --- |
| 49 | 0,553 | 1.309 | 1210 | 4 | 3,5 | 196 | 46 | 1 |
| 50 | 0,564 | 1,354 | 2210 | 5 | 3,5 | 181 | 51 | 0,5 |
| 59 | 1,184 | 2,798 | 1210 | 6 | 3,5. | 176 | 57 | 0 |
| 46 | 1,134 | 2,614 | 1210 | 8 | 3,5 | 168 | 64 | 0 |

In this Table, it can be seen that it is worth while increasing the reaction time in order to avoid the presence of metallic Mo (measured by quantitative diffraction X).

Example 2

This example illustrates the production of tungsten carbide with a large specific surface area according to the reaction: 3 WO$_2$ (vapour)+8 C solid→WC+W$_2$C+6 CO.

The same production pattern was followed as is shown in Example 1, the active charcoal having been roughly mixed with solid oxide WO$_2$. The results obtained are set out in Table 4 together with the principle operating conditions.

TABLE 4

| Test | Amount of carbon involved g | Amount of WO2 involved g | Reaction temperature °C. | Duration hours | C/W molar | Specific surface area of carbide m$^2$/g | Carbon conversion (CO included) % | Mass recovered g |
| --- | --- | --- | --- | --- | --- | --- | --- | --- |
| 23 | 1.607 | 3.946 | 1155 | 4 | 7.3/1 | 394 | — | 1535 |
| 25 | 1.614 | 4.044 | 1175 | 5 | 7.3/1 | 365 | 51% | 1.183 |
| 26 | 1.194 | 4.275 | 1190 | 4 | 5/1 | 350 | 45% | 1.216 |
| 27 | 1.501 doped 3.1% Ce | 5.123 | 1185 | 3 | 5/1 | 294 | 73% | 0.726 |

TABLE 4-continued

| Test | Amount of carbon involved g | Amount of WO2 involved g | Reaction temperature °C. | Duration hours | C/W molar | Specific surface area of carbide m²/g | Carbon conversion (CO included) % | Mass recovered g |
|---|---|---|---|---|---|---|---|---|
| 29 | 1.01 | 4.61 | 1203 | 3 | 4/1 | 386 | 57% | 0.621 |

The carbon conversion rate is in Example 2 about 50%. The product obtained is hexagonal WC with a specific surface area greater than 300 sq.m/g in tests 23-25-26-29 and with traces of W₂C and metallic tungsten.

On the other hand, test 27 in which the carbon was doped with Ce showed in equivalent quantity hexagonal WC and alpha-hexagonal W₂C and a specific surface area which is a little smaller but close to 300 sq.m/g.

The specific surface areas are particularly high.

Example 3

This example is similar to Examples 1 and 2 and illustrates the production of a vanadium carbide with a high specific surface area according to the reaction: $V_2O_5$ (gas)+7C (solid)→2VC+5CO.

The same production procedure was followed as in Example 1, the active charcoal having been roughly mixed with solid oxide $V_2O_5$. The working conditions and results are as follows:

| Test No. 34 | |
|---|---|
| Amount of carbon involved | 0.800 g |
| Amount of V₂O₅ involved | 1.001 g |
| Reaction temperature | 1196° C. |
| Reaction duration | 4 hours |
| Molar C/V ratio | 6/1 |
| Specific surface area of the carbide | 235 sq. m/g |
| Carbon conversion (CO included) | 57% |

X-ray analysis shows the presence of VC and gamma VC.

Example 4

In situ reactivation tests were carried out according to the second improvement on tungsten and molybdenum carbides with a high specific surface area obtained in the previous examples.

These carbides were impregnated by means of an aqueous solution of H₂ Pt Cl₆ so that after drying in an oven at 135° C., a quantity of Pt was obtained amounting to 0.05% in relation to the total mass of carbide. Heat treatment was carried out at 700° C. at atmospheric pressure, with a mixture of hydrogen and pentane (2.7 kPa, or 20 mm mercury, partial pressure).

This was followed by a finishing treatment establishing a vacuum at 400° C. for 1 hour followed by treatment with H₂ at 400° C. for 14 hours and then at 600° C. for 2 hours.

The activity of the reactivated carbides obtained was monitored by measuring their selectivity and efficiency for a reforming type of reaction: isomerisation of the methyl cyclopentane (MCP) and of the n-hexane (HEX). The principle consists in passing a gaseous organic compound-here of the type (C6)-over the catalyst under review and in measuring at a first stage its rate of conversion representing the total of isomeric and cracked products obtained, and in then noting the respective proportions of isomeric products and cracked products (counted in a C6 equivalent according to the example) obtained, knowing that what is the most interesting within the framework of the present invention concerns the selectivity in order to obtain isomerisation preferably and finally in detailing the results of the isomerisation itself (speed, efficiency)

In the case of the Mo₂C catalyst of the present example, conversion comparison of MCP and HEX have been carried out with any Mo₂C: non reactivated, reactivated by means of H₂ alone at 800° C. or by means of the mixture H₂+pentane at 700° C. (followed by treatment in a vacuum at 400° C. for 1 hour and then under H₂ at 400° C. for 14 hours and at 600° C. for 2 hours in order to eliminate the polymeric carbon), and reactivated according to the second improvement as has already been described.

In the case of WC, the comparison with non-reactivated WC does not appear but there is on the other hand an isomerisation comparison obtained in the presence of a conventional catalyst consisting of a gamma alumina support impregnated with 0.25% Pt.

The comparative reactions of isomerisation in the presence of the various catalysts have been carried out under the same working conditions. However, the temperatures are not always the same and it is important to note this having regard to the fact that this parameter has a considerable influence on the rate of isomerisation and therefore on its efficiency; in particular in the case of carbide reactivated by H₂ alone, the isomerisation temperature is markedly higher (600° C.) and this sole parameter multiplies the the said velocity by several orders of magnitude which may attain $10^4$ to $10^6$ in relation to a temperature of 350° C.

Tables 5 and 5a therefore show the comparative results of isomerisation of MCP and of HEX obtained with a carbide Mo₂C catalyst with a high specific surface area reactivated in various ways.

Tables 6 and 6a likewise summarise similar results obtained with WC reactivated in various ways and with Al₂O₃+0.25% Pt.

In these tables:

% conversion: represents the molar percentage of starting product converted by isomerisation and cracking.

r: represents the rate of conversion expressed as $10^{-10}$ moles of starting product converted per second and in relation to 1 g of catalyst. This represents the activity of the catalyst.

Si %: represents selectivity, that is to say the molar proportion of isomerised product present in the converted product obtained (expressed in C6).

% cracking: represents the molar proportion of cracked product present in the converted product obtained (expressed in C6).

The sum (Si+cracking) is therefore equal to 100.

Isomerisation efficiency ($10^{-10}$ mol/s.g.): this is the product (r×Si) expressed in $10^{-10}$ mole isomers obtained per second and related to 1 g of catalyst.

Isomers in C6 (%): represents the detail of the isomers obtained expressed in molar percent (DM-2,2β=dimethyl 2,2-butane, M2P=methyl 2 pentane, M3P=methyl 3 pentane, HEX=n-hexane, MCP=methyl cyclopentane, BEN=benzene, CYC=cyclohexane). The total is equal to 100.

Hydrocarbons (%): represents the detail of the cracked products obtained, shown in $C_6$ and expressed in molar percent. The total is equal to 100.

Figure 2:
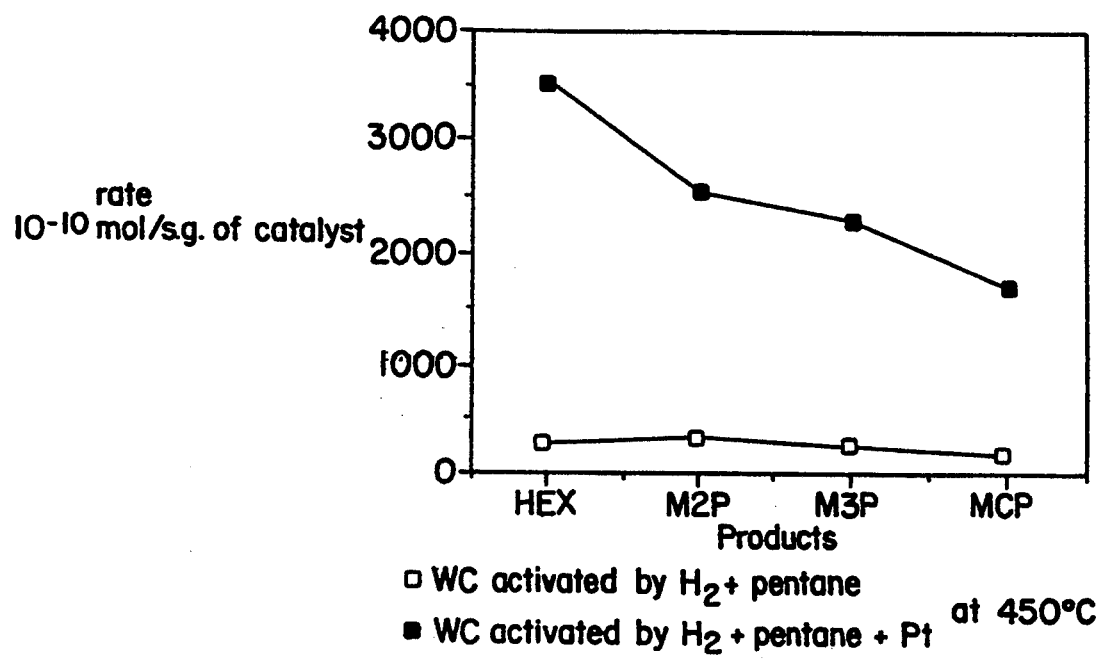
FIG. 2 is a graph of activity versus type of catalyst for a WC catalyst.

In each of FIGS. 1 and 2 which relate respectively to the catalysts, $Mo_2C$ and WC, there is a comparison of the activity (or rate of isomerisation) of catalyst treated by $H_2$+pentane and according to the invention by $H_2$+pentane+0.05% Pt in isomerisation reactions of different compounds at 350° C.

In these figures are shown the values of r given in the previous tables concerning HEX and MCP and the values of r when M2P and M3P are the starting hydrocarbons.

Tables 5 and 5a relate to $Mo_2C$ and clearly show that the isomerisation rates r, or rather the isomerisation performances, are markedly improved with the catalyst which is activated according to the present invention compared with what it was possible to obtain with activations carried out according to the prior art. This comparison is valid even with catalysts activated with hydrogen alone; indeed, the conversion was carried out in this case at 600° C. and if such a temperature had been used for a catalyst activated according to the invention, an efficiency would have been obtained which would be rather more situated towards 10,000-100,000.

In FIG. 1 which sets out the results and expands them to other products (M2P and M3P) it can be clearly seen that the isomerisation speed obtained with the activated carbide according to the invention is more than three times greater than that obtained with a carbide activated only by $H_2$+pentane without Pt.

In Tables 6 and 6a which relate to WC the same results are noted as before which therefore give a marked advantage to the carbide reactivated according to the present invention. Furthermore, this latter is compared with a conventional catalyst in which the active element is Pt deposited on a gamma alumina carrier; this illustrates again the advantage of the heavy metal carbide of high specific surface area activated by means of $H_2$+pentane in the presence of a small quantity of Pt in improving the speed and efficiency of isomerisation; but it is likewise noted that the selectivity of the reactivated carbide according to the invention is completely different from that of Pt and therefore that the Pt present in the carbide acts at the level of activation of the said carbide but not as a catalyst for the conversion of hydrocarbon.

TABLE 5

Isomerisation of MCP on the catalyst Mo2C reactivated in various ways

| Reactivation of the carbide | Prior art | | | Invention With H2 + pentane + 0.05% Pt |
|---|---|---|---|---|
| | Not reactivated | With H2 alone | With H2 + pentane | |
| Conversion temperature °C. | 400 | 600 | 350 | 350 |
| Conversion % | 0,36 | 14,94 | 1,88 | 8,03 |
| r. (10 exp −10 mole/s.g) | 53 | 1005 | 167 | 642 |
| Si % | 72 | 45 | 55 | 60 |
| cracking % | 28 | 55 | 45 | 40 |
| Isomerisation output (r × Si) | 38 | 452 | 92 | 385 |
| Isomers in C6 % | | | | |
| DM-2,2B | — | — | — | — |

TABLE 5-continued

Isomerisation of MCP on the catalyst Mo2C reactivated in various ways

| Reactivation of the carbide | Prior art | | | Invention With H2 + pentane + 0.05% Pt |
|---|---|---|---|---|
| | Not reactivated | With H2 alone | With H2 + pentane | |
| M2P | 28 | 13 | 37 | 51 |
| M3P | 11 | 0,5 | 15 | 26 |
| HEX | 33 | 1,5 | 13 | 12 |
| MCP | — | — | — | — |
| BEN | — | 85 | 29 | 11 |
| CYC | 28 | — | 6 | — |
| Hydrocarbons % | | | | |
| C5 + C1 | 44 | 3 | 38 | 32 |
| C4 + C2 | 33 | 12 | 26 | 27 |
| 2C3 | 11 | 13 | 16 | 18 |
| 3C2 | — | 15 | 7 | 8 |
| 6C1 | 12 | 57 | 14 | 15 |

TABLE 5a

Isomerisation of n-hexane on catalyst M02C reactivated in various ways

| Reactivation of the carbide | Prior art | | Invention With H2 + pentane + 0.05% Pt |
|---|---|---|---|
| | With H2 alone | With H2 + pentane | |
| Conversion °C. temperature | 600 | 350 | 350 |
| Conversion % | 40,13 | 4,16 | 14,93 |
| r. (10 exp −10 mole/s.g) | 2497 | 362 | 1283 |
| Si % | 26 | 9 | 14 |
| cracking % | 74 | 91 | 86 |
| Isomerisation output (r × Si) | 649 | 33 | 180 |
| Isomers in C6 % | | | |
| DM-2,2B | — | — | — |
| M2P | 3 | 44 | 43 |
| M3P | 1 | 25 | 23 |
| HEX | — | — | — |
| MCP | 1 | 12 | 17 |
| BEN | 56 | 19 | 17 |
| CYC | 39 | — | — |
| Hydrocarbons % | | | |
| C5 + C1 | 3 | 30 | 29 |
| C4 + C2 | 15 | 36 | 32 |
| 2C3 | 25 | 24 | 26 |
| 3C2 | 31 | 5 | 7 |
| 6C1 | 26 | 5 | 6 |

TABLE 6

Isomerisation of MCP on catalyst WC reactivated in various ways

| Reactivation of the carbide | Prior art | | Invention with H2 + pentane 0.05% Pt. | Al2O3 0.25% de Pt |
|---|---|---|---|---|
| | with H2 alone | with H2 + pentane | | |
| Conversion temperature % | 600 | 450 | 450 | 350 | 350 |
| Conversion % | 13,10 | 2,32 | 8,08* | 12,12* | 2,82 |
| r. (10 exp −10 mole/s.g) | 745 | 178 | 1680 | 945 | 114 |
| Si % | 54 | 41 | 40 | 63 | 93 |
| cracking % | 46 | 59 | 60 | 37 | 7 |
| Isomerisation output (r × Si) | 402 | 73 | 672 | 595 | 106 |
| Isomers in C6 % | | | | | |
| DM-2,2B | — | — | 1 | — | — |
| M2P | — | 34 | 28 | 57 | 15 |
| M3P | — | 8 | 23 | 24 | 25 |
| HEX | 1 | 10 | 12 | 15 | 17 |
| MCP | — | — | — | — | — |
| BEN | 99 | 48 | 35 | 4 | 26 |

TABLE 6-continued

Isomerisation of MCP on catalyst WC reactivated in various ways

| Reactivation of the carbide | Prior art with H2 alone | Prior art with H2 + pentane | Invention with H2 + pentane 0.05% Pt. | Invention with H2 + pentane | Al2O3 0.25% de Pt |
|---|---|---|---|---|---|
| CYC Hydrocarbons % | — | — | — | — | 17 |
| C5 + C1 | 44 | 20 | 20 | 26 | 68 |
| C4 + C2 | 20 | 22 | 21 | 20 | 5 |
| 2C3 | 21 | 16 | 15 | 13 | 5 |
| 3C2 | 3 | 12 | 12 | 6 | 22 |
| 6C1 | 12 | 30 | 32 | 34 | — |

*Reactions carried out with different catalyst masses

TABLE 6a

Isomeriston of n-hexane on catalyst WC reactivated in various ways.

| Reactivation of the carbide | Prior art with H2 alone | Prior art with H2 + pentane | Invention with H2 + pentane 0,05% Pt. | Invention with H2 + pentane | Al2O3 0.25% de Pt |
|---|---|---|---|---|---|
| Conversion temperature % | 600 | 450 | 450 | 350 | 350 |
| Conversion % | 32,05 | 3,78 | 16,05* | 15,82* | 2,88 |
| r. (10 exp −10 mole/s.g) | 1336 | 314 | 3510 | 1317 | 120 |
| Si % | 13 | 35 | 18 | 17 | 90 |
| cracking % | 87 | 65 | 82 | 83 | 10 |
| Isomerisation output (r × Si) | 174 | 110 | 632 | 224 | 108 |
| Isomers in C6 % | | | | | |
| DM-2,2B | — | — | — | — | — |
| M2P | 26 | 28 | 23 | 46 | 54 |
| M3P | 10 | 19 | 14 | 19 | 38 |
| HEX | — | — | — | — | — |
| MCP | 10 | 30 | 14 | 25 | 8 |
| BEN | 54 | 3 | 49 | 10 | — |
| CYC | — | 20 | — | — | — |

TABLE 6a-continued

Isomeriston of n-hexane on catalyst WC reactivated in various ways.

| Reactivation of the carbide | Prior art with H2 alone | Prior art with H2 + pentane | Invention with H2 + pentane 0,05% Pt. | Invention with H2 + pentane | Al2O3 0.25% de Pt |
|---|---|---|---|---|---|
| Hydrocarbides % | | | | | |
| C5 + C1 | 6 | 27 | 17 | 27 | 71 |
| C4 + C2 | 18 | 31 | 24 | 25 | 18 |
| 2C3 | 28 | 21 | 21 | 22 | 11 |
| 3C2 | 24 | 9 | 13 | 6 | — |
| 6C1 | 23 | 12 | 25 | 20 | — |

*Reactions carried out with different catalyst masses

Example 5

This example illustrates the application of carbides with a high specific surface area to the conversion of exhaust gases.

An $Mo_2C$ carbide was used in the form of a granular material of 0.2 to 0.5 mm having a specific surface area of 168 sq.m/g prepared by the method illustrated in Example 1 and activated at 600° C. by the method of the second improvement, using 0.05% Pt, a flow of hydrogen and propane and a finishing treatment under $H_2$ at 400° C. for 12 hours and then 600° C. for 2 hours.

Then, taking as a pattern the combustion of various pure mixtures composed of light petrol and air (mixtures: rich in petrol, stoichiometric, lean), various exhaust gases were then passed through 400 mg of granular carbide at the rate of 250 cc/min.

Table 7 summarises the experimental conditions and the conversion results obtained; by way of comparison, Test 4 relates to a stoichiometric fuel mixture, of which the exhaust gases were converted by means of one and the same conventional catalyst mass (400 mg) consisting of an $Al_2O_3$ carrier with a large surface area and 1% Pt and 0.2% Rh as active elements.

TABLE 7

| | Richness of the fuel mixture (Volume of air per 1 vol. of petrol) | Composition of exhaust gases prior to conversion ppm volume (balance = N2) | Maximum semi-conversion temperature (light off) °C. | Maximum conversion Temperature °C. | Maximum conversion Rate % |
|---|---|---|---|---|---|
| Test 1 | | | | | |
| Rich mixture | 14,25 | | | | |
| CO | | 9700 | 380 | 400 | 20 |
| NO | | 2050 | 450 | 600 | 100 |
| O2 | | 2400 | | 400 | 100 |
| Hydrocarbon (HC) | | 950 | 400 | 600 | 40 |
| Test 2 | | | | | |
| Stoichiometric mixture | 14,75 | | | | |
| CO | | 5700 | 350 | 450 | 90 |
| NO | | 2050 | 400 | 470 | 70 |
| O2 | | 6200 | | 400 | 100 |
| HC | | 950 | 380 | 600 | 75 |
| Test 3 | | | | | |
| Lean mixture | 15,25 | | | | |
| CO | | 1800 | 450 | 450 | 90 |
| NO | | 2050 | 400 | 450 | 15 |
| O2 | | 10000 | | 500 | 70 |
| HC | | 950 | 400 | 500 | 65 |
| Test 4 | | | | | |
| Stoichiometric mixture | 14,75 | | | | |
| CO | | 5700 | 250 | 400 | 100 |
| NO | | 2050 | 250 | 500 | 80 |
| O2 | | 6200 | | | |

TABLE 7-continued

| | Richness of the fuel mixture | Composition of exhaust gases prior to conversion | Maximum semi-conversion temperature | Maximum conversion | |
|---|---|---|---|---|---|
| | (Volume of air per 1 vol. of petrol) | ppm volume (balance = N2) | (light off) °C. | Temperature °C. | Rate % |
| HC | | 950 | 250 | 500 | 70 |

It can be seen that although the semi-conversion temperatures are higher than those obtained with the conventional catalyst, the conversion rates are comparable. The fact that it is necessary to use a rather higher conversion temperature with the carbides is no problem; that is tantamount to bringing the catalytic converter closer to the source of the exhaust gases, which is possible. On the other hand, the cost of the catalyst according to the invention is clearly advantageous.

Example 6

This example illustrates the application of carbides according to the invention to the catalysis of chemical reactions. Here, this will be the production of benzene (BEN) by catalytic and selective dehydrogenation of the cyclohexane (CYC).

This reaction is carried out at 450° C. in the presence of various catalysts: a molybdenum carbide with a high specific surface area according to the invention, the same carbide but this time activated by various metals of group 8 according to the second improvement, and a conventional catalyst based on 0.25% Pt deposited on alumina carrier.

Table 8 shows the overall results; it gives the percentage of CYC converted and the selectivity of the conversion, that is to say the proportion in percent of the quantity of benzene obtained from among the converted products, the efficiency of the conversion appreciating by the conversion-selectivity product. In the catalyst column is noted the residual content of the metal used to carry out the activation treatment.

It is more important to have good selectivity than good output or a good rate of conversion; indeed, the by-products of cracking are useless while with a very high level of selectivity and insufficient output it is possible easily to recycle the non-converted CYC to produce BEN.

TABLE 8

| CATALYST | CON-VERSION (%) | SELECTIVITY FOR BENZENE (%) | OUT-PUT |
|---|---|---|---|
| Mo2C | 6 | 100 | 0.06 |
| Mo2C + 690 ppm Rh | 76 | 97 | 0.74 |
| Mo2C + 500 ppm Pd | 98 | 73 | 0,71 |
| Mo2C + 500 ppm Co | 69 | 66 | 0,46 |
| Pt (0,25%)/alumina | 100 | 61 | 0,61 |

It can be seen that the molybdenum carbide according to the invention displays very good selectivity; on the other hand, its conversion efficiency needs to be improved by an activation treatment according to the invention without adversely affecting its selectivity and then the result is an output or efficiency which is generally better than that obtained with a conventional catalyst based on Pt on an alumina carrier. Activation by means of Co can be interesting on account of the very moderate cost of the said Co.

What is claimed is:

1. A method of producing a composite carbide of high specific surface area, comprising reacting a compound of a heavy metal in a gaseous state with reactive carbon having a specific surface area at least equal to 200 sq.m/g at a temperature between 900° C. and 1400° C., limiting the conversion of reactive carbon into carbide to obtain a product comprising a core of reactive carbon and an outer layer of metallic carbide with a specific surface area at least 20 m²/g, and
treating said product to convert said core to silicon carbide or a heavy metal carbide different from said outer layer.

2. A method according to claim 1, wherein said product is treated at a temperature between 1100° and 1400° C. in the presence of gaseous SiO as to convert the core to silicon carbide.

3. A method according to claim 1, wherein said product is treated at a temperature between 900° and 1400° C. with a compound in the gaseous state of a heavy metal other than that used to produce said outer layer, to convert the core to a heavy metal carbide.

4. A method of producing a heavy metal carbide of specific surface area of at least 20 m²/g, comprising reacting a compound of said heavy metal in a gaseous state with reactive carbon having a specific surface area at least equal to 200 m²/g at a temperature between 900° C. and 1400° C., to produce a heavy metal carbide, impregnating said carbide with a solution of a soluble salt of at least one group 8 metal to obtain a metal impregnated carbide, drying said impregnated carbide and treating said dried and impregnated carbide at a temperature of at least 500° C. under a stream of hydrogen and gaseous hydrocarbon.

5. A method according to claim 4, wherein the group 8 metal is selected from the group consisting of Pt, Pd, Rh, Ir, Co, Ni, and Fe.

6. A method according to claim 5, wherein the metal is Pt and the quantity of Pt retained by the carbide is at most about 0.05% based on the weight of Pt compared with the carbide.

7. A method according to any one of claims 4 to 6, wherein said treatment of dried and impregnated carbide is carried out with a mixture of H2 and gaseous hydrocarbon in excess, containing from 1 to 50%, by volume, hydrocarbon, the excess of said mixture being recycled after elimination of a by-product which is reaction water.

8. a method according to any one of claims 4 to 6, wherein the hydrocarbon is an aliphatic hydrocarbon.

9. A method according to any one of claims 4 to 6, additionally comprising a finishing treatment comprising passing over the heat treated carbide a stream of hydrogen at a temperature between 300° and 700° C. for 1 to 20 hours, said finishing treatment optionally preceded by the establishment of a vacuum at around 350° to 500° C. for 1 to 3 hrs.

10. A mixed carbide obtained according to claim 1, having a specific surface area of at least 20 m²/g, and